Dec. 13, 1938. J. BLEWETT 2,139,928
BALING PRESS DOG
Filed Oct. 26, 1935 2 Sheets-Sheet 1
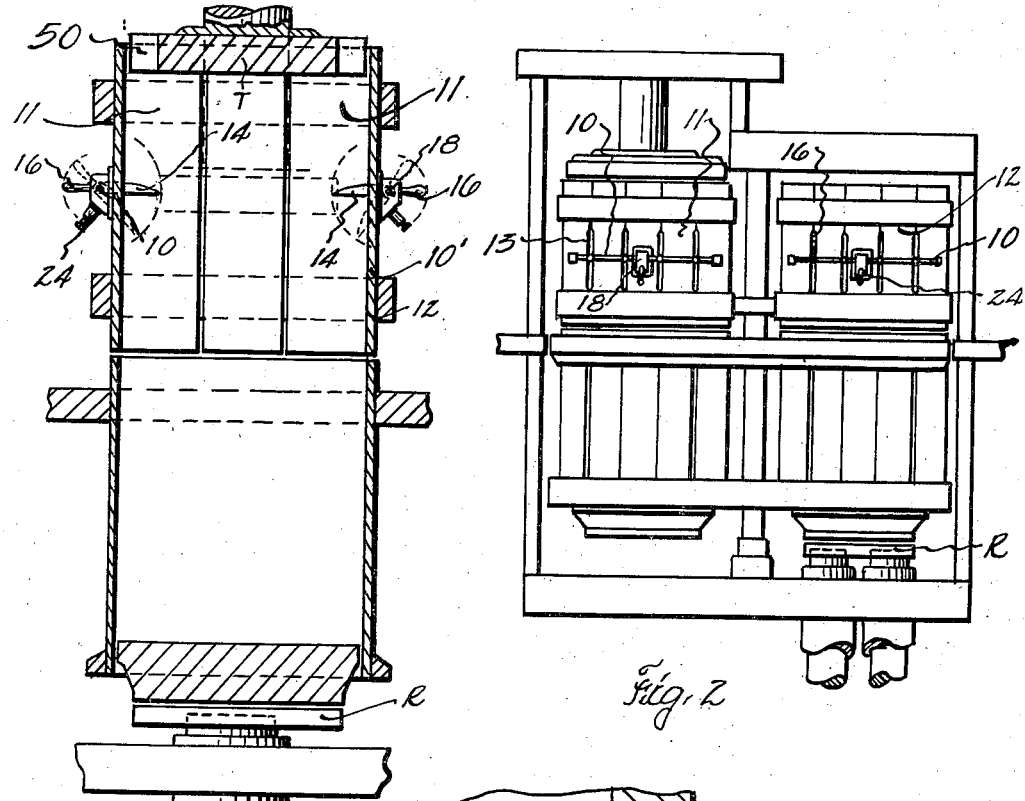
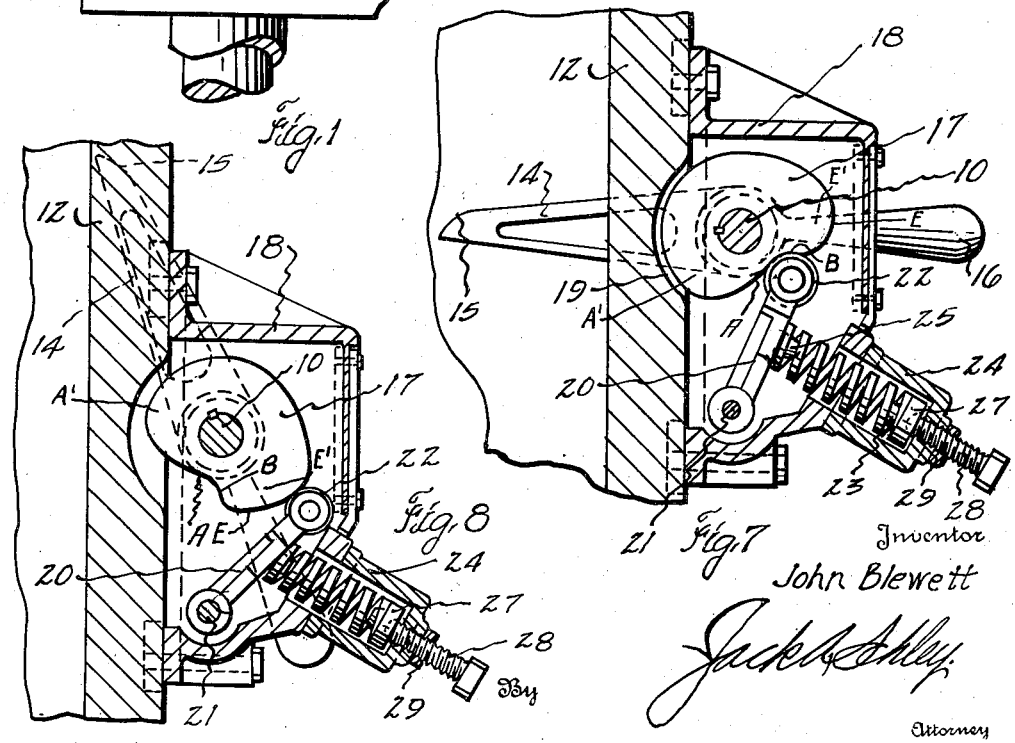
Inventor
John Blewett
By Jack A. Ashley
Attorney Dec. 13, 1938.    J. BLEWETT    2,139,928
BALING PRESS DOG
Filed Oct. 26, 1935    2 Sheets-Sheet 2
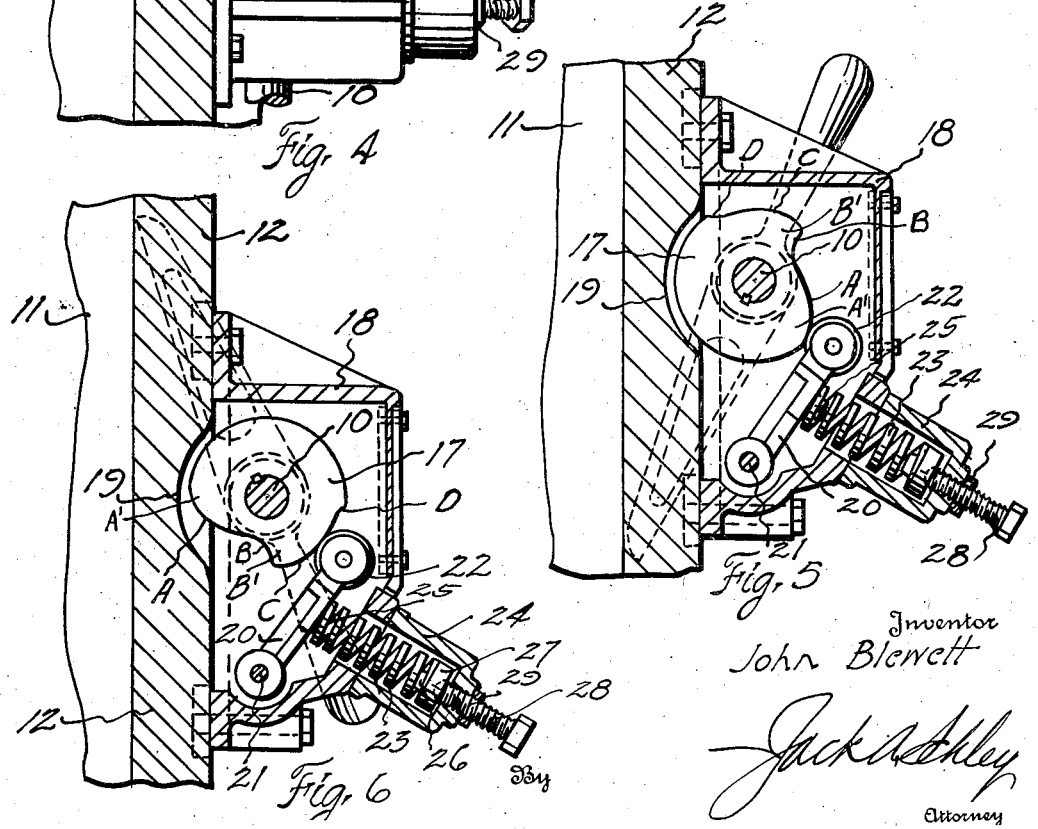
John Blewett, Inventor
Jack A. Ashley, Attorney Patented Dec. 13, 1938

2,139,928

UNITED STATES PATENT OFFICE 2,139,928

BALING PRESS DOG

John Blewett, Dallas, Tex., assignor to The Murray Company, Dallas, Tex., a corporation of Texas Application October 26, 1935, Serial No. 46,863

6 Claims. (Cl. 100—30)

This invention relates to new and useful improvements in baling press dogs.

One object of the invention is to provide an improved dog mechanism particularly adapted for cotton presses.

A particular object of the invention is to provide an improved dog mechanism in which the operation of the dogs is not affected by the position of the press box door or the movement thereof.

An important object of the invention is to provide an improved dog mechanism for cotton press boxes which is arranged so that the dogs are under tension and may be swung downwardly by the pressure of the cotton which is being tamped by the tramper, whereby said dogs move out of the path of cotton and are held so until the cotton moves therebelow at which time the dogs are automatically returned to a horizontal position, thereby retaining the cotton to prevent its upward expansion while the tramper moves upwardly to permit additional cotton to be introduced into the press box.

Another object of the invention is to provide an improved mechanism for cotton press box dogs which is arranged so that during the tamping operation, said dogs may swing downwardly to permit the tamping of said cotton, the dogs being arranged to be returned to a horizontal position upon each upstroke of the tramper and retained in such horizontal position during the shifting of the press box whereby the tamped cotton is held in said box; the mechanism being so constructed that after the shifting operation and during the pressing operation, the pressure exerted against the cotton by the press ram will swing the dogs upwardly out of the path of the cotton being compressed.

A further object of the invention is to provide an improved dog mechanism involving a cam having retaining elements located to be engaged by a spring pressed latch, whereby the dogs or fingers are held in a position to which they are moved, but are not locked in such position and may be dislodged therefrom by overcoming the tension of the spring pressed latch.

Another object of the invention is to provide a spring and cam controlled dog mechanism in which the dogs may be easily moved from a horizontal position out of the path of downwardly moving cotton in the press box, but which requires an excessive force to move the dogs upwardly out of the path of cotton moving upwardly in said box, the mechanism having means for latching the dogs in their upward position, whereby it is necessary to manually return said dogs to their horizontal position.

A still further object of the invention is to provide an improved press dog mechanism in which the dogs may be swung either upwardly or downwardly out of the path of the cotton within the press box, with means for automatically returning said dogs to their horizontal position as the cotton moving through the box has cleared said dogs.

A construction designed to carry out the invention will be hereinafter described, together with other features of the invention.

The invention will be more readily understood from a reading of the following specification and by references to the accompanying drawings, in which an example of the invention is shown, and wherein:

Figure 1 is a transverse vertical, sectional view of a baling press having the dog mechanism applied thereto, Figure 2 is a front elevation of the box, Figure 3 is a transverse, vertical, sectional view of a portion of the press box and dog mechanism, Figure 4 is a plan view of the same, the press box door being in section, Figure 5 is a view similar to Figure 3, showing the mechanism and dog in clearance position to which it may be moved upon the downstroke of the tramper, Figure 6 is a view similar to Figure 5, showing the mechanism and dog in releasing position, with the dog swung upwardly, Figure 7 is a transverse, vertical sectional view of another form of the mechanism, and Figure 8 is a view, similar to Figure 6, showing the release position of the modified form.

In the drawings, the numeral 10 designates a rock shaft, one of which may be journaled on each side of the press box 11. The press-box doors 12 are provided with the usual vertical slots 13. A pointed dog 14 is keyed on the shaft opposite each slot. The points of the dogs may be rounded on their ends as at 15.

Each dog may be provided with an outwardly extending handle 16 alined therewith, so that when the dog is in its normal operating position, as shown in Figures 1, 3 and 4, the handle will extend horizontally. As the latching mechanism operates on the shaft 10, the handles could be dispensed with and the shaft rocked by any suitable means.

On the shaft 10 a cam 17 is fastened between two of the dogs. The cam is contained in a housing 18 fastened to the door 12. The shaft extends through the sides of the housing and the cam projects into a recess 19 in the outer face of said door. A latch arm 20 is pivoted at 21 in the lower portion of the housing and inclines upwardly and outwardly with relation to the cam. The arm has a roller 22 journaled in its upper end engaging the periphery or face of the cam.

In order to urge the roller into contact with the face of the cam and to resist the outward swing of the arm 20, a coiled spring 23 is provided. This spring extends from a cap 24, secured on the lower front of the housing, into said housing and engages the arm 20, its end being supported on a boss 25. The opposite end of the spring is supported on the lug 26 of a follower block 27 in the cap. An adjusting screw 28, mounted in the cap, has its rounded inner end stepped in the block. By rotating the screw the spring is placed under the desired tension. A jamb nut 29 is used to fasten the screw in its adjusted position.

The cam 17 is formed with a lobe A' having a cam face A and a lobe B' provided with a cam face B, the lobes being so formed and their faces being such, as to provide a depression therebetween. The lobe B' has its face B extending outwardly from the depression and comparatively steep to form a stop for the roller 22. The cam face B intersects a cam face C on the outer periphery of the lobe B which latter face is formed substantially concentric with the axis of the cam. The cam face A is formed on a curve extending outwardly from the depression on a gradually increasing radius from the axis of the cam. The roller 22 being under the pressure exerted by the compressed spring 23, is yieldingly held in engagement with the cam faces, whereby the dogs 14 are supported in the various positions shown in the drawings.

When the roller 22 is in the depression of the cam and in engagement with the face B (Figure 3) the dogs 14 will be supported in a horizontal or normal position, whereby the lobe B' and the cam face B substantially overhang the roller, thus offering such resistance to a clockwise (Figure 3) rotation of the shaft 10 as to maintain the dogs 14 against upward swinging from their horizontal position. This resistance is, of course, measured by the pressure exerted by the spring 23 upon the arm 20 and roller 22, which is subject to adjustment. Owing to the gradual outward curve of the cam face A from the depression less resistance is offered to a counter-clockwise (Figure 5) rotation of the cam 17 and shaft 10, thereby permitting the dogs 14 to be more readily swung downwardly to their clearance position in the slots 13.

However, it is to be noted that when the dogs 14 are swung downwardly and the cam 17 is rotated in a counter-clockwise direction (Figure 5) the roller 22 rides outwardly on the cam face A, thereby swinging the arm 20 and gradually compressing the spring 23 and building up the spring pressure. When the dogs reach their clearance position the roller will be at the highest point of the cam face A and the spring pressure will be greatest. Owing to the fact that the roller 22 engages the cam at a point below and outwardly of the shaft 10 and the cam face A curves inwardly of the cam from this high point, the built-up spring pressure will exert its force to rotate the cam in a clockwise direction to swing the dogs to their horizontal position (Figure 3) as soon as the handle 16 is released or conditions in the press box permit.

From the position shown in Figure 3 the dogs 14 may be swung upwardly to the position shown in Figure 6. To accomplish this the roller 22 must be displaced outwardly on the cam face B so as to ride onto the face C. A stop D at the upper end of the face C engages the roller and limits the upward swing of the dogs. The face C being substantially concentric with the axis of the cam 17, there will be no rotation of the cam by the spring pressure and thus the parts will remain in the position shown in Figure 6.

In actual practice, cotton is introduced into the press box 10' (Figure 1), and the tramper T moves downwardly in said box to tamp or pack the cotton. As above pointed out, the dogs 14 are normally retained in a horizontal position extending into the box, by the engagement of the roller 22 with the cam face B. The cotton introduced into the box 10' will, of course, fall against the dogs and as the tramper T starts its downward movement, the pressure exerted against the cotton will be sufficient to swing the dogs to their downward or clearance position (Figure 5) which permits the tramper to pack said cotton in the bottom of the box.

It will be obvious that so long as the cotton is moving downwardly through the box, the dogs will be held in their downward or released position. However, as soon as the cotton moves therebelow, the dogs immediately are returned to a horizontal position by the spring 23 and roller 22 because the latter has been bearing against the high point of the cam face A. It is noted that the inner ends of the dogs swing through slots 50 in the tramper whereby said tramper does not in any way interfere with the operation of the dogs.

In practice, it is necessary to introduce additional cotton which necessitates the tramper reciprocating a number of times within the box before sufficient cotton is packed in the bottom thereof. Therefore, it is obvious that upon each down-stroke of the tramper, the dogs 14 are swung downwardly to their clearance position (Figure 5) and are automatically returned to a horizontal position after each swinging, as is shown in Figure 3. Thus, the dogs retain the packed cotton in the bottom of the box and prevent the same from expanding upwardly. It is noted that the upward pressure of the packed cotton is insufficient to displace the roller 22 outwardly under tension of the spring 23. Therefore, the dogs remain in a horizontal position to retain the packed cotton during the packing operation.

As soon as sufficient cotton has been introduced into the press box 10', the box is rotated in the usual way so that the box having the packed cotton is moved into position over the press ram R. During this shifting, the dogs 14, being in a horizontal position retain the packed cotton.

As soon as the box is properly positioned, the ram R moves upwardly which causes the packed cotton within the box to move upwardly. The pressure exerted by the ram is sufficient and forces the dogs 14 upwardly to rotate the shaft 10 to revolve the cam 17 in a clockwise direction. The dogs move to the position shown in Figure 6, clockwise rotation of the cam displacing the roller 22 outwardly.

As the shaft 10 continues to rotate the cam, the arm 20 swings outwardly and the roller 22 will ride up the face B. Continued rotation of the cam moves the face C onto the roller until the parts reach the position shown in Figure 6. Due to the roller 22 engaging the face C, the spring tension will hold the parts in this position. To restore the dogs to their horizontal position, it is only necessary to grasp the handle 16 of one of said dogs and manually rotate the shaft 10.

From the above it will be seen that the construction of the mechanism permits downward swinging of the dogs during the tamping or packing of the cotton, with said dogs automatically returning to their horizontal position. Thus, the packed cotton is retained during the tamping operation, as well as during the shifting. During the pressing operation, the dogs are moved upwardly (Figure 6) due to the ram pressure and are held so until manually restored to a horizontal position. It is noted that the position or movement of the press box doors 12 does not, in any way, affect the operation of the dogs. The parts are few in number and numerous pivots and links are avoided. The only adjustment necessary is that of the tension on the spring 23.

It is possible to construct the mechanism so that it will not only automatically return the dogs to a horizontal position after they have been swung downwardly, but will also return said dogs after upward swinging thereof. This structure is shown in Figures 7 and 8. The parts are similar to those which have been described. The lobe A' is retained, but the lobe B' is replaced with a modified lobe E'. The lobe E' has the cam face B, but in place of the face C has an eccentric face E curved outwardly from the face B, similarly to the face A. Thus when the cam 17 is rotated from the position shown in Figure 7 (dogs 14 horizontal) to the position shown in Figure 8, the spring roller 22 will act to rotate the cam in a counterclockwise direction. When the pressure of the cotton, moving upwardly within the box against the dogs is relieved, the spring and roller 22 will immediately return said dogs to their horizontal position. It will be seen that in this form regardless of whether the dogs are swung upwardly or downwardly, their return to a horizontal position is automatic with no manual operation necessary.

What I claim and desire to secure by Letters Patent is:

1. A cotton press dog mechanism including, a rock shaft, a dog fastened on said shaft, a cam fastened on said shaft and having a depression in its face and a lobe on each side of the depression, and a pivoted spring-pressed latch for engagement with said cam, the face of one of the lobes which face is adjacent the depression being of greater inclination relative to the similar face of the other of said lobes, whereby said latch will be normally retained in said depression to maintain said dog in a predetermined position and movement of said dog will be resisted by a greater force in one direction than in the other direction.

2. A cotton press dog mechanism including, a rock shaft, a dog fastened on said shaft, a cam fastened on said shaft and having a depression in its face and a lobe on each side of the depression, and a pivoted spring-pressed latch for engagement with said cam, the face of one of the lobes which face is adjacent the depression being of greater inclination relative to the similar face of the other of said lobes, whereby said latch will be normally retained in said depression to maintain said dog in a predetermined position and movement of said dog will be resisted by a greater force in one direction than in the other direction, the latch being located so that it engages the cam faces below the axis of the cam, whereby the spring pressed latch acts to rotate said cam in a return direction when the cam is rotated to move its depression from engagement with said latch.

3. A cotton press dog mechanism including, a rock shaft, a dog fastened on said shaft, a cam fastened on said shaft and having a depression in its face and a lobe on each side of the depression, and a pivoted spring pressed latch having a roller for engagement with faces of the cam, the face of one of the lobes adjacent the depression overhanging the roller whereby resistance is offered to rotation of the cam in one direction when the roller is in said depression for maintaining the dog in a predetermined normal position, the face of the other lobe extending from the depression and offering less resistance to the rotation of the cam than the first face when the roller is riding thereon and the dog is being swung to another position.

4. A cotton press dog mechanism including, a rock shaft, a dog fastened on said shaft, a cam fastened on said shaft and having a depression in its face and a lobe on each side of the depression, and a pivoted spring pressed latch having a roller for engagement with faces of the cam, the face of one of the lobes adjacent the depression overhanging the roller whereby resistance is offered to rotation of the cam in one direction when the roller is in said depression for maintaining the dog in a predetermined normal position, the face of the other lobe extending from the depression and offering less resistance to the rotation of the cam than the first face when the roller is riding thereon and the dog is being swung to another position, the last named cam face being formed on increasing radii with relation to the depression, whereby the spring-pressed latch acts to rotate the cam in a return direction when the said cam and dog are moved from said normal position.

5. A cotton press dog mechanism including, a rock shaft, a dog fastened on said shaft, a cam fastened on said shaft and having a depression in its face and a lobe on each side of the depression, a pivoted spring pressed latch for engagement with said cam, the face of one of the lobes which face is adjacent the depression being of greater inclination relative to the similar face of the other of said lobes, whereby said latch will be normally retained in said depression to maintain said dog in a predetermined position and movement of said dog will be resisted by a greater force in one direction than in the other direction, and a handle fastened on said shaft for rotating the same.

6. A cotton press dog mechanism including, a rock shaft, a dog fastened on said shaft, a cam fastened on said shaft and having a depression in its face and a lobe on each side of the depression, an arm pivoted below the cam, a roller on the upper end of the arm below the axis of the cam and engaging the face of the latter, and a spring engaging the arm for holding the roller in engagement with the cam face, the face of one of the lobes which face is adjacent the depression being of greater inclination relative to the similar face of the other of said lobes, whereby said latch will be normally retained in said depression to maintain said dog in a predetermined position and movement of said dog will be resisted by a greater force in one direction than in the other direction.

JOHN BLEWETT.